US012013101B1

(12) United States Patent
Li

(10) Patent No.: US 12,013,101 B1
(45) Date of Patent: Jun. 18, 2024

(54) LED LAMP INDEPENDENTLY AND STEPWISE ADJUSTABLE IN BEAM ANGLE

(71) Applicant: Shenzhen Wanjia Lighting Co., Ltd., Shenzhen (CN)

(72) Inventor: Fei Li, Shenzhen (CN)

(73) Assignee: Shenzhen Wanjia Lighting Co., Ltd., Shenzhen (CN)

( * ) Notice: Subject to any disclaimer, the term of this patent is extended or adjusted under 35 U.S.C. 154(b) by 0 days.

(21) Appl. No.: 18/532,007

(22) Filed: Dec. 7, 2023

(30) Foreign Application Priority Data

Aug. 28, 2023 (CN) ........................ 202322310598.1

(51) Int. Cl.

| | |
|---|---|
| ***F21V 14/06*** | (2006.01) |
| ***F21V 17/00*** | (2006.01) |
| ***F21V 17/02*** | (2006.01) |
| ***F21V 23/04*** | (2006.01) |
| *F21Y 115/10* | (2016.01) |

(52) U.S. Cl.
CPC ............ *F21V 14/06* (2013.01); *F21V 17/002* (2013.01); *F21V 17/02* (2013.01); *F21V 23/0435* (2013.01); *F21Y 2115/10* (2016.08)

(58) Field of Classification Search
CPC ........ F21V 14/06; F21V 17/002; F21V 17/02; F21V 23/0435; F21Y 2115/10
See application file for complete search history.

(56) References Cited

U.S. PATENT DOCUMENTS

| | | | | |
|---|---|---|---|---|
| 2018/0245771 | A1* | 8/2018 | Liu | F21V 5/04 |
| 2019/0264891 | A1* | 8/2019 | Wang | F21V 5/046 |
| 2021/0356110 | A1* | 11/2021 | Zhang | F21V 19/0055 |
| 2022/0034486 | A1* | 2/2022 | Shum | F21V 29/83 |
| 2022/0113004 | A1* | 4/2022 | Wang | G02B 19/0028 |
| 2022/0136667 | A1* | 5/2022 | Chen | F21V 17/02 362/362 |
| 2023/0043545 | A1* | 2/2023 | Chien | F21S 4/28 |

* cited by examiner

*Primary Examiner* — Kevin Quarterman

(57) ABSTRACT

The present invention discloses an LED lamp independently and stepwise adjustable in beam angle, the LED lamp comprises a lamp body, a lens module and an LED light source-driver assembly installed inside the lamp body, the LED light source-driver assembly comprising an LED light source and an LED driver, and the lens module is an independent module which is detachably assembled with the light source-driver assembly; wherein the lens module can independently perform stepwise adjustment on the beam angle of the LED lamp, and the stepwise adjustment of the beam angle is realized by stepwise adjustment operation on the lens module.

17 Claims, 6 Drawing Sheets

LED LAMP INDEPENDENTLY AND STEPWISE ADJUSTABLE IN BEAM ANGLE

CROSS-REFERENCE TO RELATED APPLICATION

This application is based on and claims priority to Chinese Application No. 2023223105981, filed with Chinese Patent Office on Aug. 28, 2023, entitled as "LED lamp independently and stepwise adjustable in beam angle", the content of which is incorporated herein by reference in its entirety.

TECHNICAL FIELD

The present invention relates to the field of LED lamps, in particular to an LED lamp independently and stepwise adjustable in beam angle, and to a method for stepwise adjusting beam angle of an LED lamp.

RELATED ART

In the conventional LED lamp technology, in order to achieve a better lighting application, many types of lamps such as with different beam angle, may be carried by the lamp installation personnel in many cases, in order to enable adaptive field installation. Even so, there may be times when beam angle do not meet requirements. Moreover, if the needs for different beam angle are respectively corresponding to different products, the purchased SKU (Stock Keeping Unit) will be greatly increased, which is not advantageous to the production and manufacturing cost reduction, and also is not advantageous to the producer's rapid response to the user's demand.

In the market, it is obvious that a lamp capable of adjusting the beam angle (and/or the optical power) has existed, but with the common disadvantages of low reliability, poor waterproof effect, complicated structure and the like. In the existed lamp solutions, the whole LED lamp needs to be replaced in the installation field, or different modules of the LED lamp need to be replaced, or stepless adjustment of the beam angle of the installed LED lamp needs to be carried out at the installation field, in order to meet the requirement of various beam angle of the LED lamp. Another option is a replaceable module design allowing the lens being removed and replaced, but it has disadvantages such as in poor water resistance, easy damage of the light source, increasing lens inventory, and the like, which option is either costly or inconvenient, such as the needs for adjusting in the field, and is inconvenient and less user-friendly. The LED lamp, such as LED spotlight, with stepless (or continuous) adjustment of the beam angle, appear to have certain advantages, but there are also many defects, for example, these lamps often use adjustment slides which are complex in structure, fragile and easy to damage, so that the cost and the reliability of the LED spotlight product need to be improved. Further, the technical solution with stepless adjustable beam angle is not optimal in the LED spotlight application scene where the beam angle (s) needs to be strictly defined, because the beam angle of the LED spotlight can be easily varied in a stepless way which is not easy to perceive, this is obviously not desirable for the target application scene.

In view of the above disadvantages, there is a need in the present field for innovative beam angle adjustment technique of LED lamps, in order to improve or eliminate the above defects, among others.

The content included in this Background art of the present specification, including any references cited herein and any descriptions or discussions thereof, are incorporated only for the purpose of reference, thus shall not to be considered as limitation to the scope of the present invention.

SUMMARY

In view of the above and other concepts, the present invention is presented.

In view of the foregoing, the inventor of the present application innovatively designs a novel LED lamp independently and stepwise adjustable in beam angle, and a method for stepwise adjusting a beam angle thereof, which allows a user to set and adjust the beam angle of the lamp in a stepwise manner, without damaging the waterproof performance of the lamp, and without replacing the LED lamp as a whole or the lens module.

According to one concept of the present disclosure, a lens module independently and stepwise adjustable in beam angle of the LED lamp, such as manually, is provided herein, such that the installation personnel can adjust or set the beam angle of the LED lamp in a stepwise manner in advance or in the field, without damaging the waterproof performance of the lamp, therefore, the beam angle of the LED lamp can be adjusted and/or set in a stepwise manner without replacing the whole LED lamp or replacing the lens module of the LED lamp.

According to one aspect of the present invention, there is disclosed an LED lamp independently and stepwise adjustable in beam angle, the LED lamp comprising a lamp body, a lens module and an LED light source-driver assembly installed inside the lamp body, the LED light source-driver assembly comprising an LED light source and an LED driver, wherein the lens module comprises a mounting base, a lens fixing member, and a lens member which are fit together, the lens member being arranged between the mounting base and the lens fixing member; wherein the lens module is a separate module removably assembled with the LED light source-driver assembly; wherein the stepwise adjustment of the beam angle is executed by a stepwise operation on the lens module; and wherein the relative circumferential position of the lens member relative to the mounting base and the lens fixing member is adjustable in a stepwise manner, such that the lens module is independently operable to perform a stepwise adjustment of a beam angle of the LED lamp; the mounting base is shaped as a cylinder, with two paired sets of diametrically opposite limit grooves in an inner circumferential wall of the cylinder, wherein the two paired sets of limit grooves are each provided with an equal number of limit grooves extending axially upward and circumferentially spaced apart from each other, and wherein each of the limit grooves has an axial depth corresponding to a beam angle; wherein the lens fixing member is shaped as a circular ring, with two paired sets of diametrically opposite limit pillars arranged in the circular ring, wherein the two paired sets of limit pillar are each provided with an equal number of axially extending limit pillars; wherein the two paired sets of limit grooves are respectively corresponding to the two paired sets of limit pillars, wherein the limit pillars in each set of limit pillars are positioned and sized to fit into respective limit grooves in a corresponding set of limit grooves, and an axial height of each limit pillar is smaller than an axial depth of the corresponding limit groove, such that limit recesses in the limit grooves are formed and kept upon the fit; wherein a pair of diametrically opposite limit bosses is provided in an outer circumferential wall of the lens member, and the pair of limit bosses are positioned and sized to fit into a pair of limit recesses; and wherein a beam angle of the LED lamp is defined through a fit between the pair of limit bosses and a pair of limit recesses formed by limit grooves and limit pillars corresponding to said beam angle, wherein said beam angle is stepwise adjustable to a different beam angle of the LED lamp.

According to an embodiment, a stepwise adjustment for a different beam angle with the lens module is performable independently, by stepwise adjusting to a different fit relationship between the pair of limit bosses and a pair of limit recesses formed by limit grooves and limit pillars corresponding to said different beam angle.

According to an embodiment, the number of limit pillars in each set of limit pillars is equal to the number of limit grooves in a corresponding set of limit grooves.

According to an embodiment, the numbers of limit pillars in the two paired set of limit pillars are equal to each other, and the numbers of limit grooves in the two paired set of limit grooves are equal to each other.

According to an embodiment, differences between axial heights of limit pillars and axial depths of corresponding limit grooves are equal to one another, such that axial dimensions of the limit recesses are equal to one another.

According to an embodiment, circumferential spacing between adjacent limit pillars in each set of limit pillars are equal to one another, and is respectively equal to corresponding circumferential spacing between adjacent limit grooves in a corresponding set of limit grooves.

According to an embodiment, each set of limit grooves is provided with 4 limit grooves respectively corresponding to beam angles of 20°, 30°, 45° and 60°; and wherein each set of limit pillars is correspondingly provided with 4 limit pillars respectively corresponding to beam angles of 20°, 30°, 45° and 60°.

According to an embodiment, the lens member comprises a cylindrical lens holder with inner and outer circumferential walls, and an optical lens disposed in the inner circumferential wall of the lens holder and extending radially inwardly therefrom; and wherein a pair of diametrically opposite limit bosses are provided extending radially outwardly from the outer circumferential wall.

According to an embodiment, the lens module is stepwise adjustable in beam angle of the LED lamp in a range of 15°-90°.

According to an embodiment, the LED lamp is an LED spotlight or an LED Accent Light.

According to an embodiment, the lens module is replaceable.

According to an embodiment, an outer circumferential wall of the mounting base is provided with threads, and the lens module is detachably screwed with the lamp body via thread fit between the mounting base and the lamp body.

According to an embodiment, the LED lamp is provided with an infrared receiver, such that the LED lamp is of an infrared remote control type.

According to an embodiment, the infrared receiver is installed in the lamp body of the LED lamp.

According to an embodiment, the infrared receiver is provided with an infrared receiver window.

According to an embodiment, the LED lamp further comprises a lampshade, and the lampshade is detachably assembled with the lens module and the LED light source-driver assembly.

According to one aspect of the present invention, there is disclosed a method of stepwise adjusting a beam angle of an LED lamp, wherein the LED lamp comprises a lens module, the lens module being an independent module detachably assembled with a light source-driver assembly of the LED lamp, wherein the lens module comprises a mounting base, a lens fixing member, and a lens member which are fit together, the lens member being arranged between the mounting base and the lens fixing member; wherein limit grooves are provided in the mounting base, and each of the limit grooves has an axial depth corresponding to a beam angle; and limit pillars are arranged in the lens fixing member which can fit with corresponding limit grooves to form and limit recesses therein; the method comprising: mounting the lens member with the mounting base, such that limit bosses of the lens member respectively fit into limit grooves corresponding to a desired beam angle; and mounting the lens fixing member abutting against the lens member, such that the limit pillars are correspondingly inserted into the limit grooves corresponding to the desired beam angle and abut against the limit bosses in the limit grooves, so as to define the desired beam angle of the LED lamp; wherein the stepwise adjustment of the beam angle of the LED lamp is executable by performing a manual stepwise switch operation on the lens module independently, wherein the stepwise switch operation comprises: manually switching limit bosses into respective limit grooves corresponding to a different beam angle in a stepwise manner, and thereafter mounting the lens fixing member into abutting against the lens member in order to fit the limit bosses in the limit grooves corresponding to the different beam angle, such that the LED lamp is stepwise adjusted to said different beam angle.

According to an embodiment, the mounting fit between the limit boss and the limit recess is a snap fit or a tight fit.

According to an embodiment, the lens member is integrally injection-molded.

According to an embodiment, the lens module can adjust the beam angle of the LED lamp in a range of 10° to 120°, for example, in a range of 15° to 90°.

According to an embodiment, the lens module is replaceable.

According to an embodiment, the LED lamp further includes a foot configured to fix the LED lamp in an external mounting position.

According to an embodiment, the LED lamp further comprises a lampshade, and the lampshade is detachably assembled with the lens module and the light source-driver assembly.

According to an embodiment, the adjustment operation on the lens module is a manual operation.

According to an embodiment, the adjustment operation on the lens module itself is performed in a case where the lens module is separated from the LED lamp.

According to an embodiment, different beam angle adjustment of the LED spotlight is realized by adjusting the lens module itself in a stepwise manner and/or replacing with a different lens module.

According to an embodiment, the LED lamp may be selected from one of an outdoor LED spotlight, an LED Accent Light, landscape lighting LED lamp, a projection lighting LED lamp and a floodlighting LED lamp, especially a high-power outdoor LED spotlight, a courtyard LED spotlight, a landscape lighting LED spotlight, and the like.

More embodiments of the present invention can also implement other non-one-to-one listed advantageous technical effects, which may be partially described below, and it may be expected and understood by those skilled in the art upon reading the present invention.

BRIEF DESCRIPTION OF THE DRAWINGS

The above features and advantages and other features and advantages of these embodiments, and the implementation way thereof, would be apparent to those skilled in the art, the present invention and the embodiments thereof may be better understood, by reference to the following figures and the related description.

DETAILED DESCRIPTION

Details of one or more embodiments of the present invention will be set forth in the following description of the accompanying drawings and detailed description. Other features, objects, and advantages of the present invention may be apparent from these descriptions, drawings, and claims.

It should be understood that the illustrated and described embodiments are not limited in applications to the details of construction and arrangement of components set forth in the following description or illustrated in the accompanying drawings. The illustrated embodiments may be other embodiments and can be implemented or executed in various ways. The examples are provided by way of explanation of the disclosed embodiments and not by way of limitation. Indeed, it will be apparent to those skilled in the art that various modifications and variations can be made to the embodiments of the present invention without departing from the scope or spirit of the present invention. For example, features illustrated or described as part of one embodiment may be used with another embodiment to still produce additional embodiments. Accordingly, the present disclosure encompasses such modifications and variations that fall within the scope of the appended claims and their equivalents.

In addition, the terms “first” and “second” are used for descriptive purposes only and cannot be understood as indicating or implying relative importance or implicitly indicating the number of indicated technical features. Thus, the features defined with “first” and “second” may explicitly or implicitly include one or more of the features. In the description of the present disclosure, the meaning of “plurality” is two or more, unless specifically defined otherwise.

The term “adjusting beam angle” refers to operating the optical lens module in the LED lamp, including optical focusing, adjusting the distance between the optical lens and the LED light source, and the like, so as to achieve the purpose of adjusting the beam angle of the LED lamp.

Also, it is to be understood that the phrases and terms used herein are for the purpose of description and should not be considered limiting. The use of “comprising”, “including” or “having” and variations thereof herein is intended to open, in an open manner, items listed thereafter and equivalents thereof, as well as additional items.

The present disclosure will be described in more detail below with reference to specific embodiments of the present disclosure.

Figure 1:
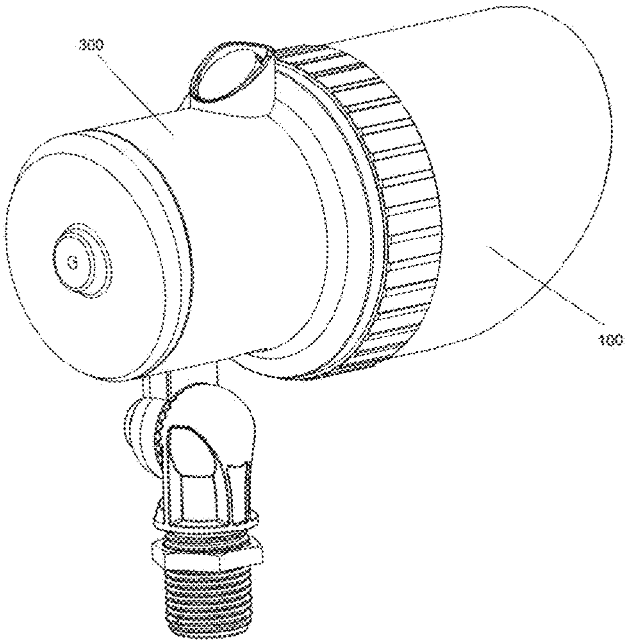
FIG. 1 is a schematic, overall view of an LED spotlight with a lens module independently and stepwise adjustable in beam angle in accordance with an embodiment of the present invention, schematically illustrating the external shape and construction of the assembled LED spotlight of this embodiment.
Figure 2:
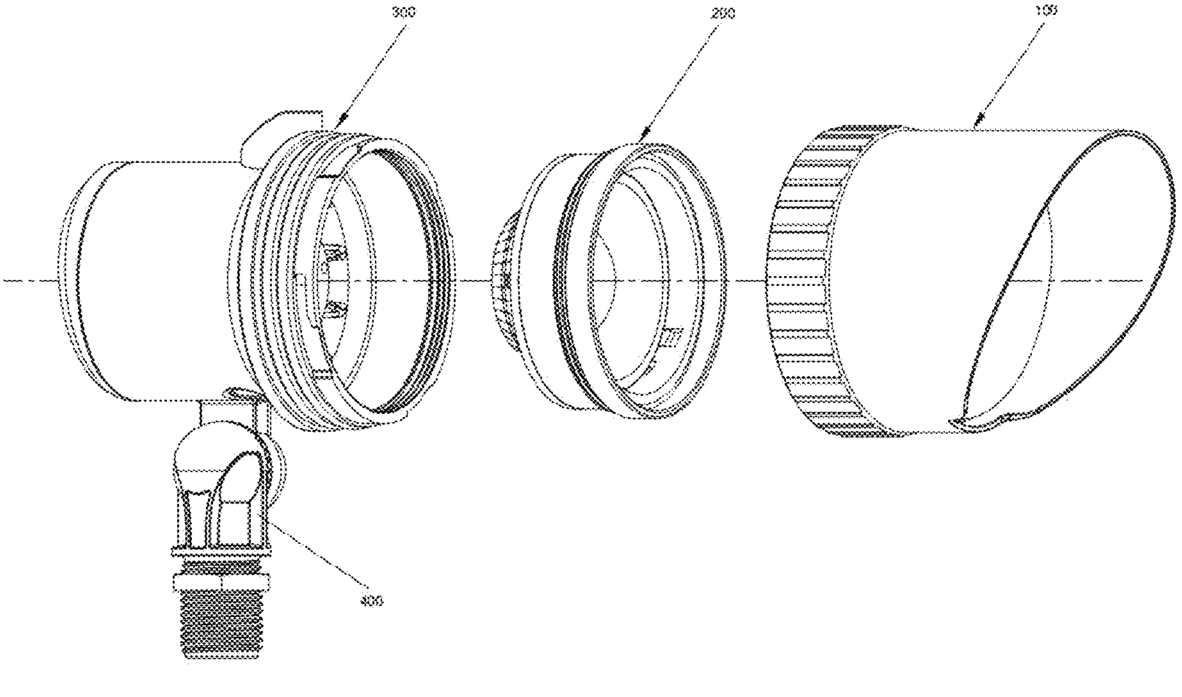
FIG. 2 is an exploded schematic view of the configuration of the LED spotlight shown in FIG. 1, further schematically showing the overall assembly and construction of the LED spotlight shown in FIG. 1, including a lens module independently and stepwise adjustable in beam angle.

FIG. 1 schematically illustrates a schematic overall view of an LED spotlight with a lens module independently and stepwise adjustable in beam angle in accordance with an embodiment of the present invention, which schematically illustrates the external shape and configuration of the LED spotlight of this embodiment after assembly. FIG. 2 is an exploded schematic view of the configuration of the LED spotlight shown in FIG. 1, further schematically showing the common components and construction of the LED spotlight shown in FIG. 1, including a lens module independently and stepwise adjustable in beam angle.

As shown in FIGS. 1 and 2, the LED spotlight comprises a lampshade 100, a lamp body 300, and a lens module 200 assembled in the lamp body 300 and independently and stepwise adjustable in beam angle. According to one or more examples, inside the lamp body 300 there is provided with other modules and components, including for example, an LED driver 340, an LED light source 330, and the like; In addition, the lamp body 300 may also be provided with structure feature (s) for mounting and/or fixing the feet 400, and with a hollow construction for arranging and installing various components inside the lamp body 300, as shown, these are all prior art that can be implemented by a person skilled in the art without creative efforts, and are no longer further described herein.

Figure 3:
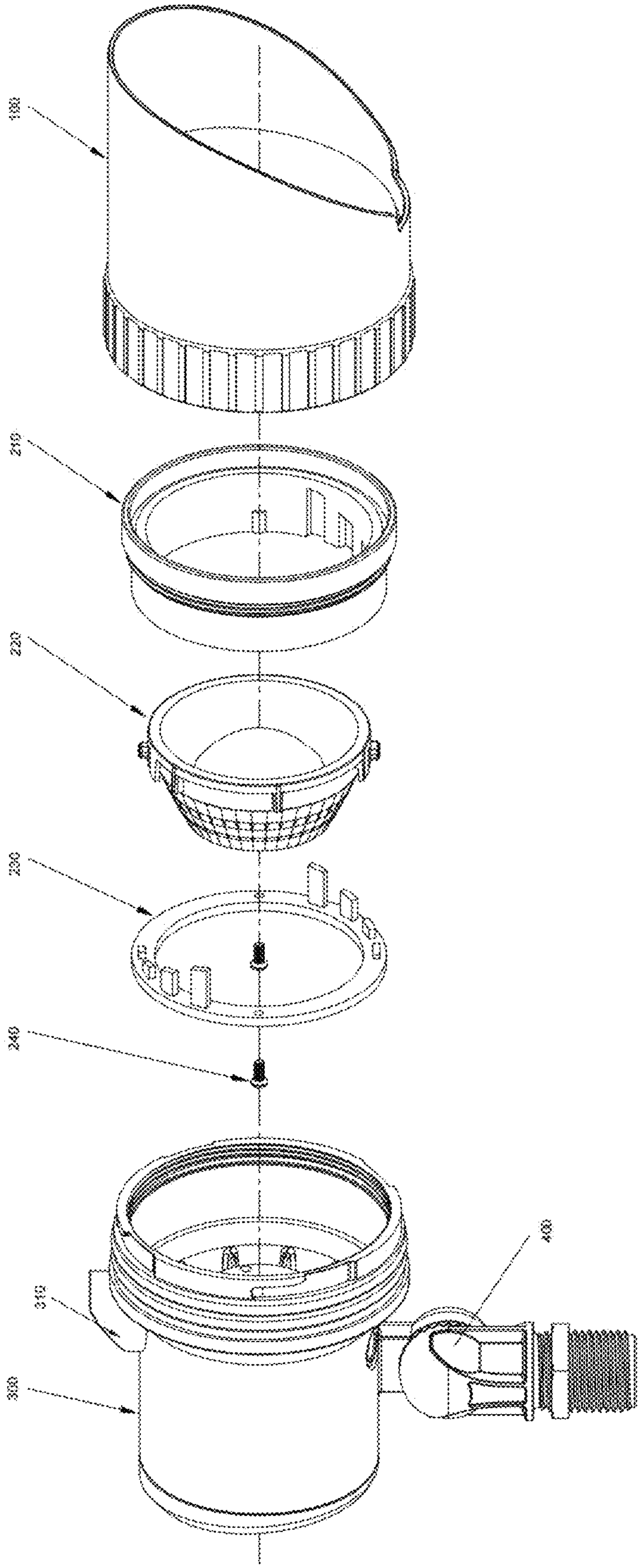
FIG. 3 is a further enlarged exploded view of the configuration of the LED spotlight shown in FIG. 2, and in particular, further schematically illustrating the exploded configuration of the lens module as shown in FIG. 2 which is independently and stepwise adjustable in beam angle, and its assembly, and the schematic assembly relationship with other parts of the LED spotlight.

FIG. 3 is a further enlarged exploded view of the configuration of the LED spotlight shown in FIG. 2, and in particular, further schematically showing the exploded configuration and the assembly relationship of the lens module 200 independently and stepwise adjustable in beam angle in FIG. 2, and schematically the assembly relationship with other parts of the LED spotlight.

Figure 4:
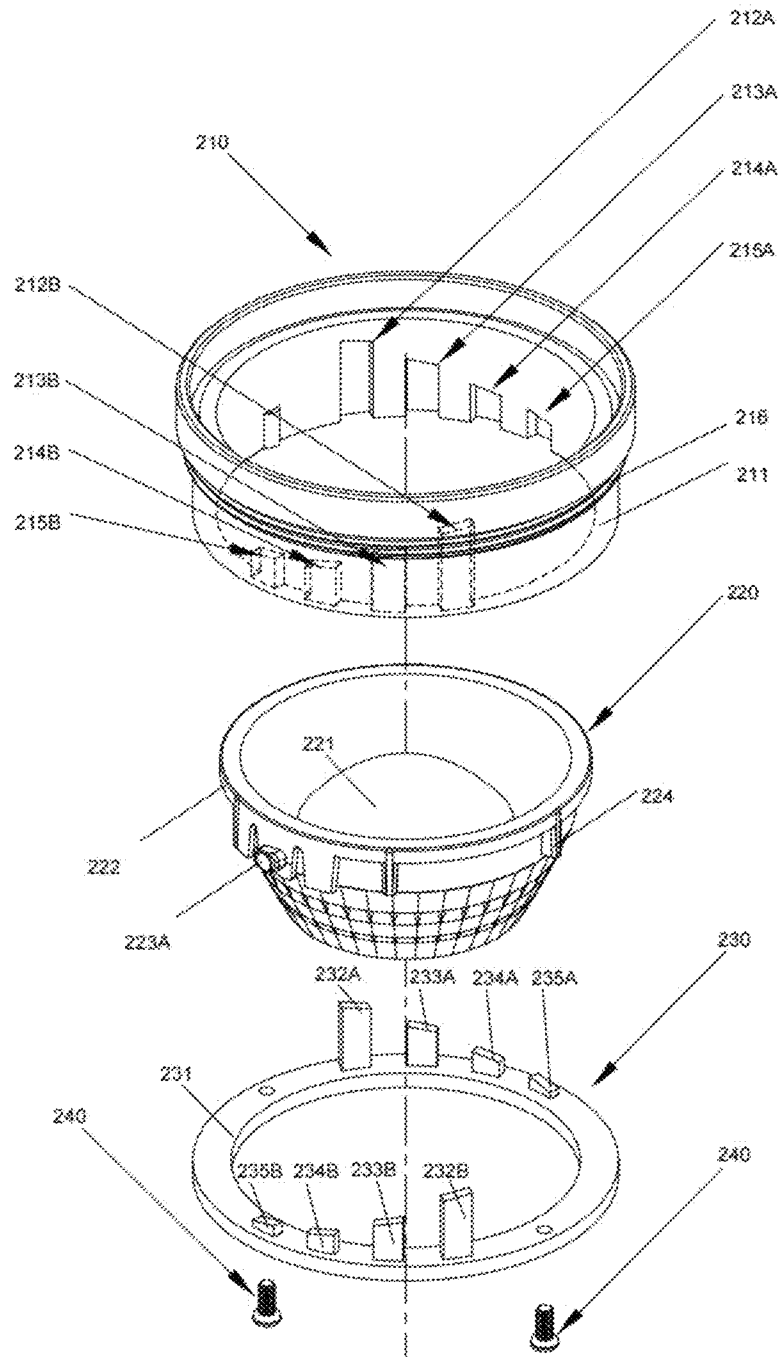
FIG. 4 is a further enlarged schematic perspective exploded view of the lens module shown in FIGS. 2-3, further schematically illustrating details of the construction and the components of the lens module of this embodiment.

FIG. 4 is a further enlarged schematic exploded view of the lens module 200 shown in FIGS. 2-3, further schematically illustrating details of the construction and the components of the lens module 200 of this embodiment.

Figure 5:
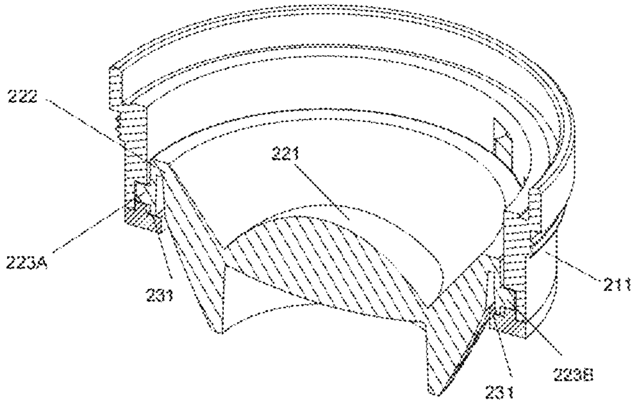
FIG. 5 is a schematic view of the assembled lens module shown in FIGS. 3-4, taken along a longitudinal centerline, schematically illustrating details of the partial assembly of the lens module of this embodiment, which is specifically selected to illustrate in section a pair of diametrically opposite limit bosses in the lens member that are snap fit into limit recesses defined by the limit groove and the limit pillar corresponding to a beam angle, and are abutted and fixed by the lens fixing member (shown below in the FIG. 5).

FIG. 5 is a schematic view of the lens module 200 shown in FIGS. 3-4, taken along a longitudinal centerline after assembly the lens module 200, schematically illustrating details of partial assembly of the lens module 200 of this embodiment, particularly illustrating in section a pair of diametrically opposite limit bosses 223A-223B in the lens member 200 of the lens module 200, which snap fit into limit recesses as defined by limit grooves 212A-212B, 213A-213B, 214A-214B or 215A-215B, etc. fit with limit pillars 232A-232B, 233A-233B, 234A-234B or 235A-235B, etc. corresponding to a selected beam angle, and are abutted against in place by top surface 231 or cylinder of the lens fixing member 230, and may be secured with, for example, a fastening screw 240 when assembly of the lens module 200.

Figure 6:
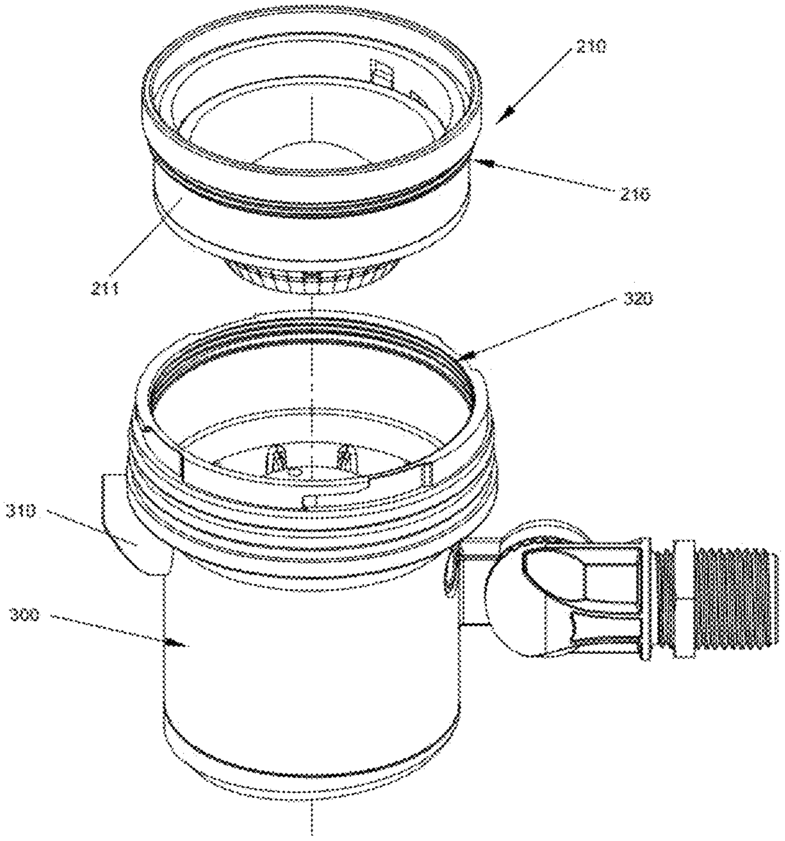
FIG. 6 is an exploded schematic view of a partial construction of the LED spotlight shown in FIG. 1, further schematically showing the arrangement of male threads (external teeth) and female threads (internal teeth) in the lens module and the lamp body, and the arrangement of the infrared receiver in the lamp body.

FIG. 6 is an exploded schematic view of a partial construction of the LED spotlight embodiment shown in FIG. 1, further schematically showing the arrangement of male threads (external teeth) and female threads (internal teeth) in the lens module 200 and the lamp body 300, and the arrangement of the infrared receiver 310 in the lamp body 300.

Figure 7:
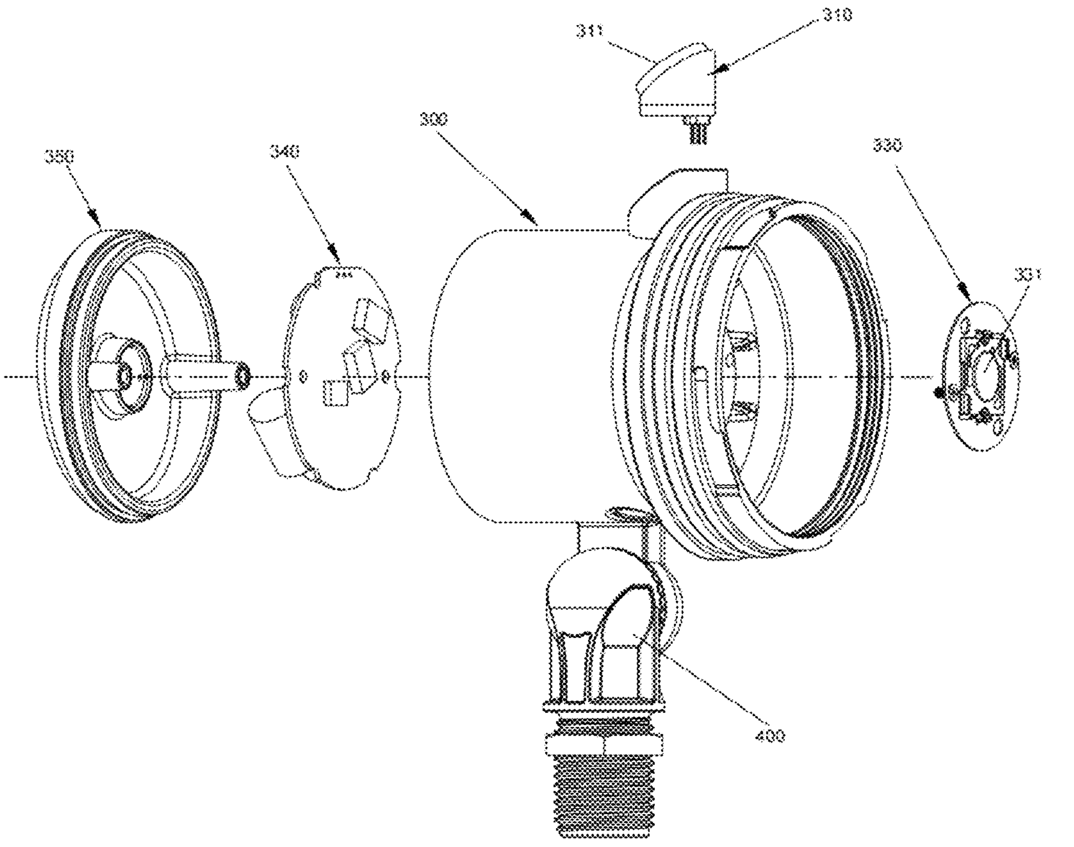
FIG. 7 is an exploded schematic view of a partial construction of the LED spotlight shown in FIG. 1, further schematically showing the arrangement of the bottom cover, the LED light source and the LED driver arranged inside the lamp body, and more details of the infrared receiver in the lamp body.

FIG. 7 is an exploded view of a portion of the LED spotlight shown in FIG. 1, further schematically showing the arrangement of a bottom cover 350, the LED light source 330 and the LED driver 340 in the lamp body 300, and more details of the infrared receiver 310 in the lamp body 300.

As shown in FIGS. 1-7, the LED lamp shown in FIG. 1 includes a lens module 200 and an LED light source-driver assembly installed in the lamp body 300. As shown in FIG. 7, the LED light source-driver assembly may include an LED light source 330 and an LED driver 340, and the LED light source 330 includes at least one LED 331 that may be assembled in the LED circuit board, and in circumstances where color, light power and/or color temperature needs to be adjustable, there may be provided with multiple LEDs 331. The lens module 200 in this embodiment can be an independent module removably assembled with the LED light source-driver assembly. In this embodiment, stepwise adjustment of the beam angle of the LED lamp can be performed independently through the lens module 200 itself, and by way of the stepwise adjustment operation on the lens module 200 itself, the stepwise adjustment of the beam angle of the LED lamp can be realized by performing a, as detailed below.

According to an embodiment, as shown in FIGS. 2-5, the lens module 200 includes a mounting base 210, a lens fixing member 230, and a lens member 220 disposed between the mounting base 210 and the lens fixing member 230, which are assembled together and fit in lens module 200 as a whole in a telescoped or sleeved manner, for example, as shown in FIG. 4. The mounting base 210 is, for example, a generally cylindrical (which may be a single cylinder or a multi-stage cylinder), and there are two paired sets of diametrically opposite limit grooves (e.g., as shown in FIG. 4, one set (212A; 213A; 214A; 215A) paired with the other set (212B; 213B; 214B; 215B), each set being provided in the inner circumferential wall of the cylinder 211 of the mounting base in corresponding diametrically opposite positions, wherein each set of the limit grooves (212A-215A or 212B-215B) is provided with the same number of, such as four, limit grooves (212A-215A or 212B-215B) that extend axially upward from the bottom of the cylinder 211 and are circumferentially spaced from one another, wherein each limit groove has an axial depth corresponding to one beam angle. For example, the axial depth of a pair of diametrically opposite limit grooves 212A, 212B corresponds to a beam angle of 30°, the axial depth of a pair of diametrically opposite limit grooves 213A and 213B corresponds to a beam angle of 45°, the axial depth of a pair of diametrically opposite limit grooves 214A and 214B corresponds to a beam angle of 60°, and so on.

The lens fixing member 230, as illustrated in FIG. 4, may be generally circular ring or cylindrical in shape, with two paired sets of diametrically opposite limit pillars 232A-235A and 232B-235B on the top surface 231 of the circular ring or cylinder 231 of the lens fixing member 230, as shown in FIG. 4, wherein one set of limit pillars 232A-235A is paired with and diametrically opposite to the other set of limit pillars 232B-235B one by one, with each limit pillar (e.g. 232A, . . . , 235A) in one set is diametrically opposite to the paired limit pillar (e.g. 232B, . . . , 235B) in the other paired set, as shown in FIG. 4. All limit pillars 232A-235A and 232B-235B extend axially, i.e., parallel to the dashed center line in FIG. 4. Of course, the two paired sets may of course be other arrangements, such as integrally extending from a circular ring or cylindrical wall, etc. Each limit pillar set (e.g., 232A-235A or 232B-235B) is provided with axially extending limit pillars which are paired one-by-one with and diametrically opposite to the limit pillars in the other set, as shown in FIG. 4. On the other hand, The limit pillars in each limit pillar set (232A-235A; 232B-235B) are positioned and size to respectively fit into corresponding limit grooves in the corresponding limit groove sets (212A-215A; 212B-215B) upon assembly, and the axial heights of limit pillars (232A; 233A; 234A; 235A and 232B; 233B; 234B; 235B) are respectively less than the axial depths of the corresponding limit grooves (212A; 213A; 214A; 215A and 212B; 213B; 214B; 215B), such that upon the fit a pair of limit recesses are formed and kept in the corresponding two limit grooves (for example, two recesses into which the limit bosses 223A and 223B shown in FIG. 5 are fit in place, recesses shown in FIG. 6, etc.), facilitating mounting of the lens member 220, and thereby defining and keeping a beam angle of the LED spotlight corresponding exactly to the two recesses and thus the two limit grooves where the limit bosses 223A and 223B are now fitting in. It will be apparent to those skilled in the art that, as discussed above, a pair of different limit recesses in different two limit grooves will and can define a different specific beam angle.

Although the top surfaces of the limit pillars may be a flat surface, according to an example, as shown in FIG. 4, the top surfaces of the limit pillars 232A; 233A; 234A; 235A and 232B; 233B; 234B; 235B may be slightly sloped or disposed as a ramp (as shown in FIG. 4), such that the sloped top surfaces or ramps of the limit pillars can keep a certain margin for adapting to small assembly tolerance or manufacturing tolerance when fit with (such as by abutting against) the limit bosses 223A and 223B.

As shown in FIGS. 4-5, a pair of diametrically opposite limit bosses 223A and 223B are provided in the outer circumferential wall of the lens member 220 extending radially outwardly therefrom, and the pair of limit bosses 223A and 223B are positioned and sized for respectively fitting and securing into corresponding limit recesses as formed by the corresponding paired limit pillars-limit grooves 212A-232A; 213A-233A; 214A-234A; 215A-235A and 212B-232B; 213B-233B; 214B-234B; 215B-235B upon assembly. Thus, the desired beam angles of the LED lamp, such as 20°, 30°, 45°, 60°, etc., can be defined and determined by the assembly and fitting between the pair of limit bosses 223A and 223B and the paired limit pillars-limit grooves corresponding to the desired beam angles, respectively.

As shown in FIG. 4, a person of ordinary skill in the art may understand that the lens module 200 itself can be independently performed to execute and complete a stepwise adjustment operation on the beam angle of the LED spotlight. By adjusting the mounting and fit between the pair of limit bosses 223A and 223B of the lens member 220 and a pair of recesses as formed by the paired limit pillars-limit grooves of the mounting base 210 and the lens fixing member 230 corresponding to a certain beam angle, the installation personnel can perform independent stepwise adjustment of the beam angle of the lens module 200 by itself.

According to an example, in each set of the two paired sets of diametrically opposite limit pillars, the number of the limit pillars is equal to each other, for example, the number is at least 2, for example, 3, 4, or 5, etc. Accordingly, in each corresponding set of the two paired sets of diametrically opposite limit grooves, the number of the limit grooves is equal to each other, for example, the number is correspondingly at least 2, for example, 3, 4, or 5, etc.

According to an example, the number of limit pillars in each limit pillar set (232A; 233A; 234A; 235A, or 232B; 233B; 234B; 235B) is equal to the number of limit grooves in the corresponding limit groove set (212A; 213A; 214A; 215A, or 212B; 213B; 214B; 215B), for example, as shown in FIG. 4, in each set, the numbers of the limit pillars and the corresponding limit grooves are 4, respectively.

According to an example, the differences between the axial heights of all the limit pillars and the axial depths of the corresponding limit grooves are equal to one another, so that the axial heights of all the limit recesses are equal, thereby ensuring that the limit bosses 223A and 223B can match and reliably fit with (e.g., snap in) the corresponding limit recesses, and accurately adjust and define the corresponding beam angle as desired.

According to an example, it is preferred that the circumferential spacing of the adjacent limit pillars in each limit pillars set (e.g., 232A; 233A; 234A; 235A, or 232B; 233B; 234B; 235B) are equal to one another, and are respectively equal to the circumferential spacing of the corresponding adjacent limit grooves in the corresponding limit groove set (212A; 213A; 214A; 215A or 212B; 213B; 214B; 215B), such that it is more convenient for assembly, for example, during assembly in batches, it is not necessary to deliberately find the matching and paring between the mounting bases 210 and the lens fixing members 230, rather, in an interchangeable manner, any of the mounting bases 210 can be assembled with any of the lens fixing members 230 more conveniently.

According to an example, as shown in FIG. 4, each limit groove set is provided with four limit grooves (212A; 213A; 214A; 215A, or 212B; 213B; 214B; 215B) which are respectively corresponding to four different beam angles, e.g., 20°, 30°, 45°, and 60°. Each limit pillar set is correspondingly provided with four limit pillars (e.g., 232A; 233A; 234A; 235A, or 232B; 233B; 234B; 235B) which are respectively corresponding to the afore-mentioned four limit grooves, and also to the afore-mentioned four different beam angles.

According to an example, the lens member 220 has a cylindrical lens holder with an outer circumferential wall 222, and an optical lens 221 disposed in an inner side (i.e., an inner circumferential wall) of the lens holder, such as a convex lens which is installed or integrally formed in the inner circumferential wall of the cylindrical lens holder. A pair of diametrically opposite limit bosses 223A and 223B project radially outward from the outer circumferential wall 222, and the limit bosses 223A and 223B may be generally cuboid, tapered, ramped, or any other shaped for fitting, so long as it is ensured that its shape, position and size can facilitate the limit boss 223A and 223B to reliably fit into the corresponding limit recess during assembly. Additionally, the circumferential wall 222 may also be provided with a plurality of radially outwardly protruding ribs or tabs, such as ribs 224, which serve to reinforce the lens holder and for limiting and securing the lens holder in place radially after assembly.

According to an example, the lens module 220 can be stepwise adjustable in beam angles of the LED lamp in a range of 10° to 120°, such as in a range of 15° to 90°, for example, in 3 steps, in 4 steps, or in 5 steps, and so on. Moreover, the lens module 220 may be replaceable or removable, for example, various lens modules 220 may correspond to various stepwise adjustment modes, and to different angle adjustment ranges, and so on.

One example of an LED lamp is an LED spotlight or an LED Accent Light.

According to an example, as shown in FIGS. 1-3, the LED lamp may further include a foot 400 configured to secure the LED lamp in an external mounting position, for example, the foot 400 may be provided with a mounting angle adjustment configuration, and may have external thread and a mating nut for ease of installation and fixation.

According to an example, as shown in FIG. 6, the outer circumferential wall of the cylinder 211 of the mounting base 210 is provided with a thread, such as a male thread 216, and through the male thread 216, the lens module 200 is configured to be detachably screwed with the lamp body 300 via its corresponding female thread 320.

Figure 8:
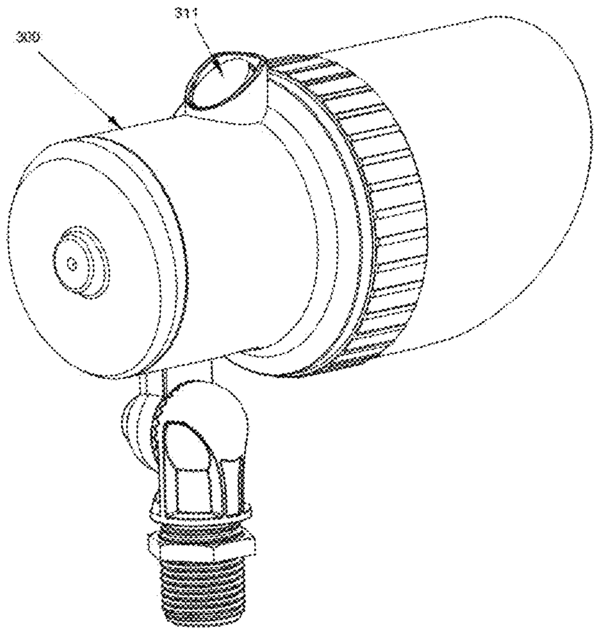
FIG. 8 is a schematic overall view of the LED spotlight shown in FIG. 1 viewed from another angle, particularly showing the infrared receiver window of the infrared receiver assembled in the lamp body.
Figure 9:
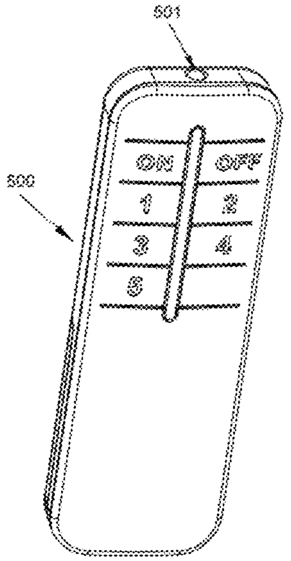
FIG. 9 schematically shows an infrared remote control paired with the infrared receiver shown in FIG. 8, the infrared remote control being designed to adjust the LED light brightness and/or color temperature and/or light color of the LED spotlight embodiment shown in FIG. 1.

FIG. 8 is a schematic overall view of the LED spotlight shown in FIG. 1 viewed from another angle, in particular showing the infrared receiver window 311 of the infrared receiver 310 mounted in the lamp body 300. FIG. 9 schematically illustrates an infrared remote controller 500 that can be used in pairing with the infrared receiver 310 shown in FIG. 8, wherein the infrared remote controller 500 is designed to adjust the LED brightness and/or the color temperature and/or the light color of the LED spotlight embodiment shown in FIG. 1, and is provided with an infrared emitter window 501. As shown in FIGS. 7-9, the LED lamp can be provided with an infrared receiver 310 integrated therewith, so that the LED lamp is infrared remote controllable. The infrared receiver 310 may be mounted in the lamp body 300 of the LED lamp. The infrared receiver 310 may be provided with an infrared receiver window 311 built in an opening of the wall of the lamp body, and the infrared receiver window 311 is transparent or translucent, particularly it allows infrared light to pass through, so as to facilitate receiving infrared signal. The infrared receiver 310 of the LED lamp may be used in conjunction with the infrared remote controller 500 having the infrared emitter window 501 shown in FIG. 9, so that the LED lamp is of an infrared remote control type. For example, it can control the LED brightness, the light color and/or the color temperature of the LED lamp, the on/off of the lamp, etc., in an infrared remote control manner.

According to an example, the LED lamp may further include a lampshade 100, and the lampshade 100 may be detachably installed with the lens module 200 and the light source-driver assembly.

An embodiment of a method for stepwise adjusting a beam angle of an LED lamp is further described below in combination with the above embodiment and the drawings.

An embodiment of the method for stepwise adjustment of the beam angle may include the following.

Mounting the lens member 220 to the mounting base 210 such that its pair of diametrically opposite limit bosses 223A and 223B are inserted into a pair of limit grooves corresponding to a desired beam angle.

Mounting the lens fixing member 230 into abutting against the lens member 220, such that the limit pillars are respectively inserted into corresponding limit grooves and abutting against the limit bosses 223A and 223B in the limit grooves (in place in the limit recesses of the limit grooves) corresponding to the desired beam angle, in order to define the desired beam angle of the LED lamp, such as, 20°, etc.

The stepwise adjustment of the beam angle of the LED lamp is executable, by performing a manual stepwise switch operation on the lens module 200 independently. The manual stepwise switch operation on the lens module 200 may comprise: manually switching limit bosses 223A and 223B of the lens member 220 into respective limit grooves (in place in the limit recesses) corresponding to a different beam angle like 30°, 45°, or 60°, etc., in a stepwise manner; and manually switching and mounting the lens fixing member 230 into abutting against the lens member 220 in order to switch and fit the limit bosses 223A and 223B in the limit grooves corresponding to the different beam angle like 30°, 45°, or 60°, etc., such that the LED lamp is now stepwise adjusted to said different beam angle, like 30°, 45°, or 60°, etc.

Since the lens module 200 itself can be independently operated to execute a manual stepwise switch and adjustment operation on the beam angle of the LED lamp, the beam angle can be adjusted independently of other components of the LED lamp, so that it is possible that the beam angle of the lens module 200 can be manually adjusted on-site or before the factory or field assembly, and assembling the adjusted lens module 200 to the LED spotlight, and thereafter mounting the LED lamp in place with the desired beam angle, without further adjusting operation on the beam angle after the LED lamp is mounted. In this way, the convenience of the adjustment is greatly improved, and the difficulty and cost of installation, maintenance and replacement can be reduced.

According to an example, after the adjustment of the lens module 200 in beam angle is finished, the lens module 200 is assembled in the lamp body 300, and then the lampshade 100 is installed, so that the assembly of the LED lamp with the adjusted desired beam angle, like LED spotlight, is completed. For example, when the lighting effect needs to be changed, the user just needs to dismount the LED lamp from the mounting position, remove the lens module 200 and stepwise adjust the beam angle to a desired new beam angle such as by performing an aforementioned manual stepwise switch operation; or alternatively, the user just replaces the old lens module 200 with a new lens module 200 which has been adjusted to a desired beam angle through the above-mentioned adjustment operation. Therefore, the LED lamp with the lens module independently and stepwise adjustable in beam angle, such as an LED spotlight, can be directly used for on-site assembly or installation, on-site maintenance or on-site replacement, so that the user friendliness is greatly improved, the assembly, installation and debugging cost are reduced, and even the safety and reliability of on-site installation and debugging are improved.

An applicable LED lamp for the present invention may include an LED spotlight or an LED Accent Light, for example, an outdoor LED spotlight, in particular a high-power outdoor LED spotlight, a courtyard LED spotlight, a landscape lighting LED Accent Light, and the like; of course, other types of lamps may also be suitable, such as stage lamps, stage spotlights, and so on.

The foregoing description of the embodiment of the present invention is presented for purposes of illustration. The foregoing description is not intended to be exhaustive or to limit the present invention to the precise steps and/or forms as disclosed above, obviously, many modifications and variations can be made by the those skilled in the art in light of the above teachings. It is intended that the scope and its equivalents of the present invention will be defined by the appended claims.

What is claimed is:

1. An LED lamp independently and stepwise adjustable in beam angle, the LED lamp comprising a lamp body, a lens module and an LED light source-driver assembly installed inside the lamp body, the LED light source-driver assembly comprising an LED light source and an LED driver, wherein the lens module comprises a mounting base, a lens fixing member, and a lens member which are fit together, the lens member being arranged between the mounting base and the lens fixing member;

wherein the lens module is a separate module removably assembled with the LED light source-driver assembly;

wherein the stepwise adjustment of the beam angle is executed by a stepwise operation on the lens module; and wherein the relative circumferential position of the lens member relative to the mounting base and the lens fixing member is adjustable in a stepwise manner, such that the lens module is independently operable to perform a stepwise adjustment of a beam angle of the LED lamp;

wherein the mounting base is shaped as a cylinder, with two paired sets of diametrically opposite limit grooves in an inner circumferential wall of the cylinder, wherein the two paired sets of limit grooves are each provided with an equal number of limit grooves extending axially upward and circumferentially spaced apart from each other, and wherein each of the limit grooves has an axial depth corresponding to a beam angle;

wherein the lens fixing member is shaped as a circular ring, with two paired sets of diametrically opposite limit pillars arranged in the circular ring, wherein the two paired sets of limit pillar are each provided with an equal number of axially extending limit pillars;

wherein the two paired sets of limit grooves are respectively corresponding to the two paired sets of limit pillars, wherein the limit pillars in each set of limit pillars are positioned and sized to fit into respective limit grooves in a corresponding set of limit grooves, and an axial height of each limit pillar is smaller than an axial depth of the corresponding limit groove, such that limit recesses in the limit grooves are formed and kept upon the fit;

wherein a pair of diametrically opposite limit bosses is provided in an outer circumferential wall of the lens member, and the pair of limit bosses are positioned and sized to fit into a pair of limit recesses; and wherein a beam angle of the LED lamp is defined through a fit between the pair of limit bosses and a pair of limit recesses formed by limit grooves and limit pillars corresponding to said beam angle, wherein said beam angle is stepwise adjustable to a different beam angle of the LED lamp.

2. The LED lamp as claimed in claim 1, wherein a stepwise adjustment for a different beam angle with the lens module is performable independently, by stepwise adjusting to a different fit relationship between the pair of limit bosses and a pair of limit recesses formed by limit grooves and limit pillars corresponding to said different beam angle.

3. The LED lamp according to claim 1, wherein the number of limit pillars in each set of limit pillars is equal to the number of limit grooves in a corresponding set of limit grooves.

4. The LED lamp according to claim 3, wherein the numbers of limit pillars in the two paired set of limit pillars are equal to each other, and the numbers of limit grooves in the two paired set of limit grooves are equal to each other.

5. The LED lamp according to claim 1, wherein differences between axial heights of limit pillars and axial depths of corresponding limit grooves are equal to one another, such that axial dimensions of the limit recesses are equal to one another.

6. The LED lamp according to claim 1, wherein circumferential spacing between adjacent limit pillars in each set of limit pillars are equal to one another, and is respectively equal to corresponding circumferential spacing between adjacent limit grooves in a corresponding set of limit grooves.

7. The LED lamp according to claim 1, wherein each set of limit grooves is provided with 4 limit grooves respectively corresponding to beam angles of 20°, 30°, 45° and 60°; and wherein each set of limit pillars is correspondingly provided with 4 limit pillars respectively corresponding to beam angles of 20°, 30°, 45° and 60°.

8. The LED lamp according to claim 1, wherein the lens member comprises a cylindrical lens holder with inner and outer circumferential walls, and an optical lens disposed in the inner circumferential wall of the lens holder and extending radially inwardly therefrom; and wherein a pair of diametrically opposite limit bosses are provided extending radially outwardly from the outer circumferential wall.

9. The LED lamp according to claim 1, wherein the lens module is stepwise adjustable in beam angle of the LED lamp in a range of 15°-90°.

10. The LED lamp according to claim 1, wherein the LED lamp is an LED spotlight or an LED Accent Light.

11. The LED lamp of claim 1, wherein the lens module is replaceable.

12. The LED lamp according to claim 1, wherein an outer circumferential wall of the mounting base is provided with threads, and the lens module is detachably screwed with the lamp body via thread fit between the mounting base and the lamp body.

13. The LED lamp according to claim 1, wherein the LED lamp is provided with an infrared receiver, such that the LED lamp is of an infrared remote control type.

14. The LED lamp according to claim 13, wherein the infrared receiver is installed in the lamp body of the LED lamp.

15. The LED lamp according to claim 13, wherein the infrared receiver is provided with an infrared receiver window.

16. The LED lamp according to claim 1, wherein the LED lamp further comprises a lampshade, and the lampshade is detachably assembled with the lens module and the LED light source-driver assembly.

17. A method of stepwise adjusting a beam angle of an LED lamp, wherein the LED lamp comprises a lens module, the lens module being an independent module detachably assembled with a light source-driver assembly of the LED lamp, wherein the lens module comprises a mounting base, a lens fixing member, and a lens member which are fit together, the lens member being arranged between the mounting base and the lens fixing member; wherein limit grooves are provided in the mounting base, and each of the limit grooves has an axial depth corresponding to a beam angle; and limit pillars are arranged in the lens fixing member which can fit with corresponding limit grooves to form and limit recesses therein;

the method comprising:

mounting the lens member with the mounting base, such that limit bosses of the lens member respectively fit into limit grooves corresponding to a desired beam angle; and mounting the lens fixing member abutting against the lens member, such that the limit pillars are correspondingly inserted into the limit grooves corresponding to the desired beam angle and abut against the limit bosses in the limit grooves, so as to define the desired beam angle of the LED lamp;

wherein the stepwise adjustment of the beam angle of the LED lamp is executable by performing a manual stepwise switch operation on the lens module independently, wherein the stepwise switch operation comprises: manually switching limit bosses into respective limit grooves corresponding to a different beam angle in a stepwise manner, and thereafter mounting the lens fixing member into abutting against the lens member in order to fit the limit bosses in the limit grooves corresponding to the different beam angle, such that the LED lamp is stepwise adjusted to said different beam angle.

* * * * *